United States Patent [19]

Hoermann

[11] 3,850,808

[45] Nov. 26, 1974

[54] A WASTEWATER TREATMENT SYSTEM

[76] Inventor: Werner Hoermann, c/o New England Wastewater Systems Inc., Rt. 100, P.O. 412, West Dover, Vt. 05356

[22] Filed: Oct. 19, 1972

[21] Appl. No.: 298,860

[52] U.S. Cl................. 210/195, 210/197, 210/199, 210/220
[51] Int. Cl............................................... C02c 1/08
[58] Field of Search............................. 210/4–7, 14, 210/15, 17, 11, 86, 195, 197, 220, 221, 170, 199, 202, 206

[56] References Cited
UNITED STATES PATENTS

| | | | |
|---|---|---|---|
| 2,867,945 | 1/1959 | Gotaas et al....................... | 210/15 X |
| 2,987,186 | 6/1961 | Burgoon et al. ..................... | 210/7 X |
| 3,126,333 | 3/1964 | Williams .............................. | 210/15 |
| 3,403,095 | 9/1968 | Chipperfield et al................. | 210/17 |
| 3,419,146 | 12/1968 | Koulovatos ..................... | 210/195 X |
| 3,487,937 | 1/1970 | Koulovatos ....................... | 210/195 |
| 3,546,110 | 12/1970 | Englesson et al........................ | 210/5 |
| 3,598,236 | 8/1971 | Nordlander et al............. | 210/195 X |
| 3,677,409 | 7/1972 | Ferm et al. .......................... | 210/195 |
| 3,679,053 | 7/1972 | Koulovatos et al................... | 210/86 |
| 3,681,236 | 8/1972 | Bergles et al. ................... | 210/195 X |

Primary Examiner—Samih N. Zaharna
Assistant Examiner—Robert H. Spitzer
Attorney, Agent, or Firm—H. Gibner Lehmann; K. Gibner Lehmann

[57] ABSTRACT

A means for treating wastewater wherein the means comprises a storage treatment tank having a receiving chamber for accommodating waste products to be processed, an aeration chamber adjoining the receiving chamber to receive fluids comprising solids and liquids therefrom, a settling chamber for separating solids from liquids, and means for transferring aerated fluid from the aeration chamber to the settling chamber. The tank further includes a second settling chamber to receive liquid from the first settling chamber and feedback means connected with the receiving chamber and with the second settling chamber for returning the higher density portions of the contents of the latter to the receiving chamber for further processing. The aeration chamber is provided with a diffuser to introduce air upper pressure into the aeration chamber in order to aerate the contents thereof. The system also comprises additional feedback means connected with the receiving chamber and with the first-mentioned settling chamber for transferring a portion of the contents of the latter to the receiving chamber for further processing. A discharge chamber is also provided, to receive fluid from the second settling chamber and to discharge liquid portions thereof through a tank outlet. The method of using the apparatus of the invention comprises filtering wastewater from the receiving chamber through a screen and into the aeration chamber where the wastewater is aerated, transferring the aerated wastewater to a settling chamber where the higher density portions of the wastewater are allowed to settle to the bottom of the chamber, and transferring these higher density portions to the receiving chamber for further processing.

1 Claim, 5 Drawing Figures

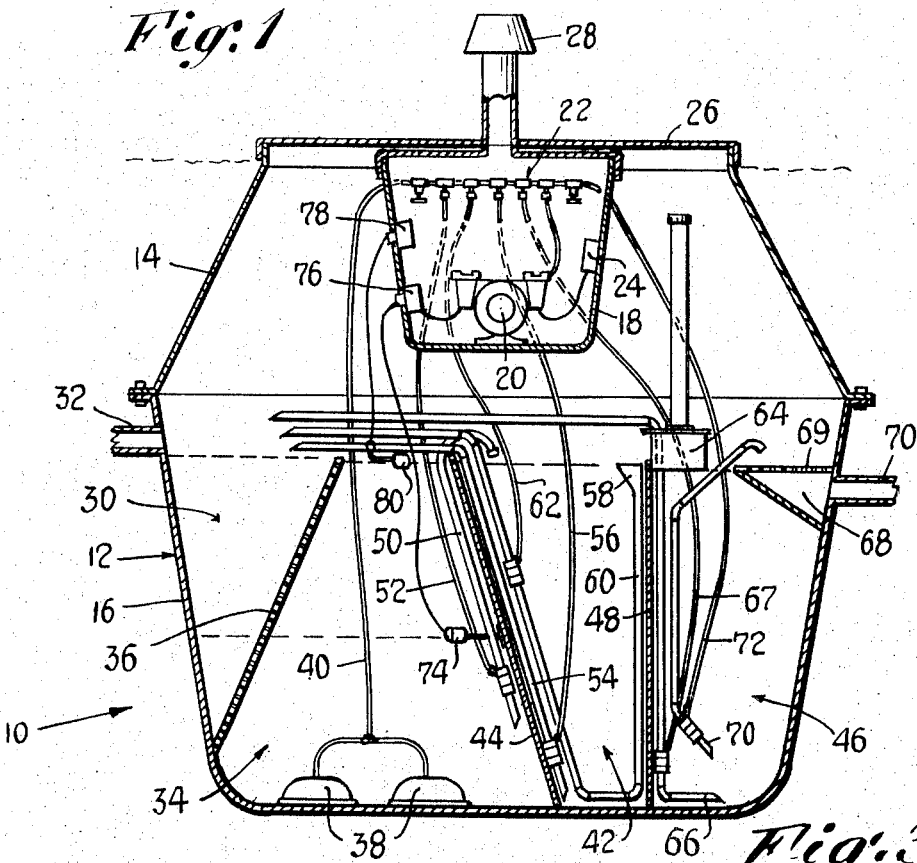
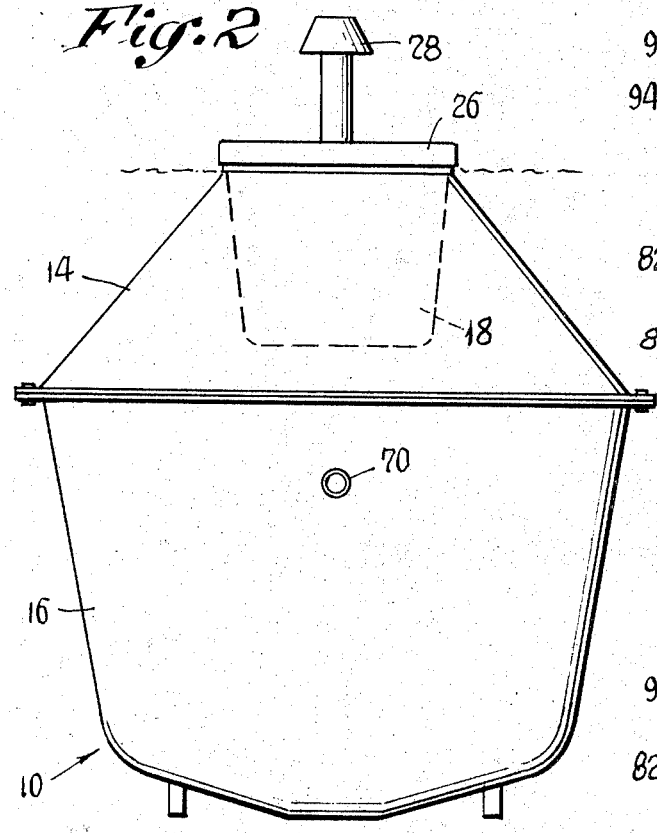
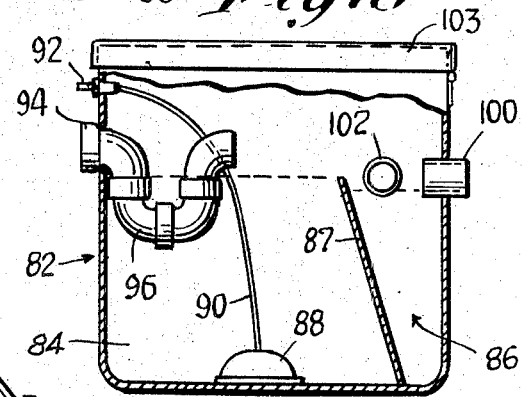
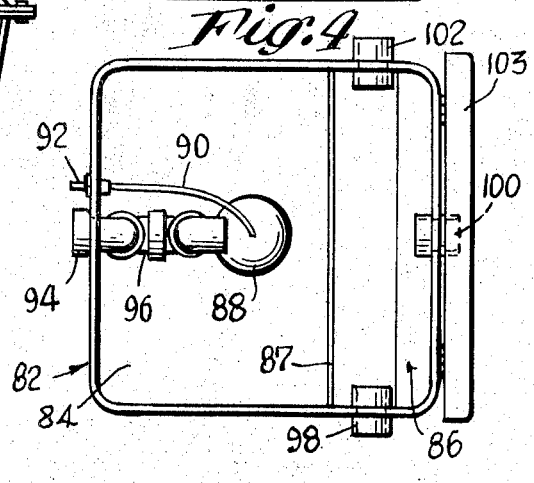

3,850,808

A WASTEWATER TREATMENT SYSTEM

BACKGROUND

This invention relates generally to sewage and wastewater disposal and treatment systems and methods, and more particularly to systems employing aerobic treatment of waste products, aerobic digestion being that which occurs in the presence of free oxygen. In the past, a large number of different arrangements for sewage treatment and disposal have been employed. Probably the oldest is the cesspool or septic tank, wherein digestion of waste products occurs under anaerobic conditions, those occuring in the absence of free circulating air. It is well known that the course of digestion and the nature of the resultant products are dependent to a large extent on the availability of oxygen, and that the products of digestion of sewage solids when oxygen is absent are quite different from the products of digestion of the same material when oxygen is available. The cesspool or septic tank suffers from a number of distinct problems. It is estimated that at best only 30percent of the waste products are removed and stored in the tank, the remainder tending to drain off into leaching fields, if there are such, carrying with it undissolved solids and sludge which tend to clog the fields and cause poor fluid distribution. Eventually the drain fields have to be unclogged or replaced. The very limited air supply contained in the tank prevents the highly desirable aerobic bacteria from forming. Thus poor digestion results from the absence of this bacteria. Also, in a septic tank the detention time tends to be rather long, and little or no provision for accommodating surge loads is provided.

Large scale aerobic treatment has been employed in commerical sewage disposal plants, but heretofore the individual homeowner or small commerical concern has had no effective and efficient means of sewage treatment.

SUMMARY

The above drawbacks and disadvantages of prior sewage treatment systems are obviated by the present invention which has for an object the provision of a novel wastewater treatment system which is simple in construction, virtually maintenance-free, and which provides a high degree of efficiency and effectiveness in the removal of solid and suspended waste products. A related object is the provision of a system which is constructed from non-corrosive materials and which has non-mechanical internal parts, thereby to provide a virtually unlimited lifetime of operation. Another object of the invention is the provision of an improved system as above, which has a plurality of chambers for separating waste solids from liquids and has substantial reserve volume to accept surge loads without sacrificing treatment efficiency. A still further object of the invention is the provision of a method of using the apparatus for treating wastewater involving separation of solids at several different stages, aeration, and recirculation of the solids to a stage early in the treatment, for further processing and digestion.

The above objects and advantages are accomplished by a novel and improved, multi-chamber storage treatment tank having a receiving chamber for accommodating waste products to be processed, an aeration chamber adjoining the receiving chamber to receive fluids therefrom, a first and a second settling chamber for separating waste solids from liquids, a discharge chamber receiving liquid from the second settling chamber, and feedback means connected with the receiving chamber and with the second settling chamber for returning the higher density portions of the contents of the latter to the receiving chamber for further processing. The tank further includes a diffuser in the aeration chamber to introduce air under pressure into the fluid contents thereof, and an additional feedback means connected with the receiving chamber and with the first settling chamber for transferring a portion of the contents of the latter to the receiving chamber for further processing.

Other objects and advantages will hereinafter appear. In the figures, illustrating one preferred embodiment of the invention:

FIG. 1 is a broken-away, front elevational view of the improved wastewater treatment system of the present invention, particularly illustrating the storage treatment tank.

FIG. 2 is a side elevational view of the tank of FIG. 1.

FIG. 3 is a broken-away, front elevational view of a distribution box constituting part of the wastewater treatment system of the present invention.

FIG. 4 is a top plan view of the distribution box of FIG. 3, shown with its lid removed.

Figure 5:
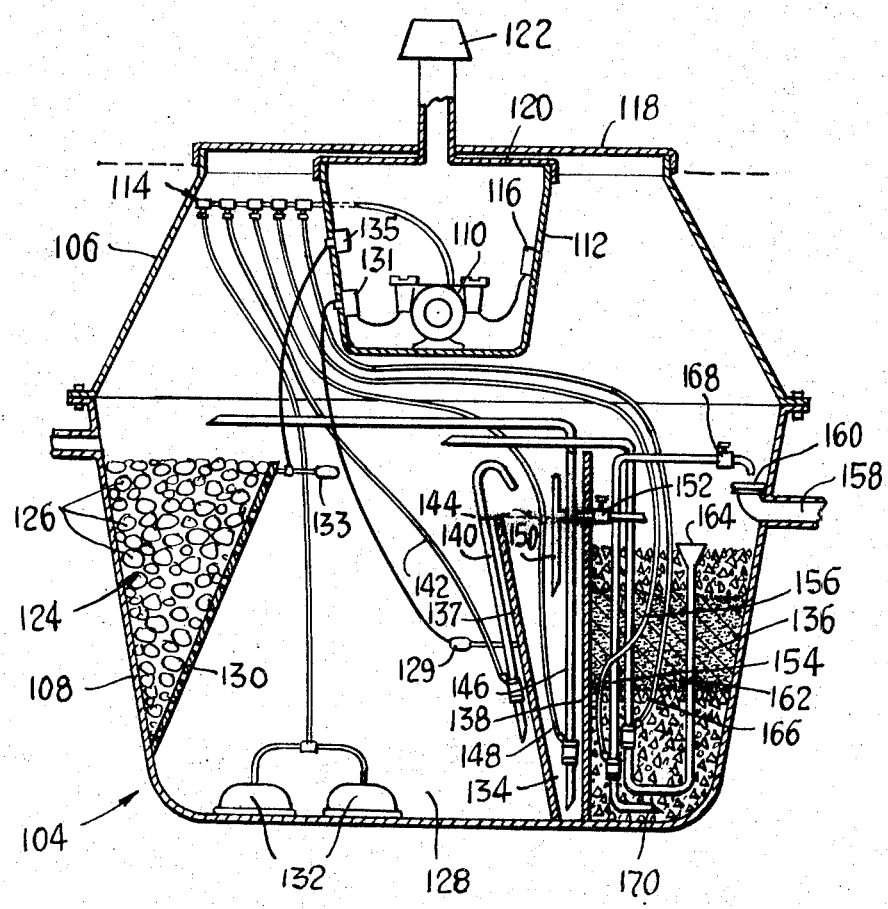
FIG. 5 is another embodiment of the invention showing the use of particular masses.

Referring to FIGS. 1 and 2 there is illustrated a wastewater treatment system 10 comprising a storage treatment tank 12 having an upper casing 14 and a lower casing 16. A motor housing 18, containing an electrically operated air compressor or pump 20, supplies compressed air to a series of air valves 22. A control box 24 is provided to interrupt power to the compressor 20. The upper casing 14 of the tank is provided with a removable lid 26 which carries an air vent 28.

In accordance with the present invention, the storage treatment tank 12 has a receiving chamber 30 for accommodating waste products to be processed, the latter entering the chamber through an inlet 32, and closely adjoining the receiving chamber is an aeration chamber 34. As can be seen in FIG. 1, the chambers 30 and 34 have a common wall 36 which has the form of a filter screen or perforated divider which enables liquids and solids having a diameter of less than ⅜ inch to pass therethrough from the receiving chamber 30 to the aeration chamber 34. In time there will be established in the receiving chamber an accumulation of organic solids which will give rise to establishment therein of a colony of saprophytic bacteria. Solids having a diameter larger than ⅜ inch are retained in the receiving chamber until such time as agitation and biochemical reaction by the bacteria sufficiently reduce the size of the solids to enable them to pass through the perforated divider 36.

The aeration chamber 34 is provided with ceramic diffusers 38 and a hose line 40 connected therewith to introduce air under pressure from the compressor 20 into the lower portion of the chamber 34, wherein the air will bubble through the fluid contents thereof and aerate the same, creating an aerobic, odorless liquor having a brownish color.

By the present invention the storage treatment tank 12 further comprises a first settling chamber 42 separated from the aeration chamber by a solid wall or baffle 44, and a second settling chamber 46 separated from the first by another baffle 48. The first settling chamber 42 receives the liquor from the aeration chamber by means of a conduit 50. A hose line 52 connected therewith supplies air under pressure from the compressor 20 to one portion of the conduit, the conduit and hose line constituting air lift means for transferring aerated fluid from the aeration chamber to the first settling chamber. This transfer occurs at a predetermined rate according to the daily flow into the storage treatment tank. In the first settling chamber 42, suspended solids and sludge are allowed to settle to the bottom where they are picked up by another conduit 54 and transferred back to the receiving chamber 30 by means of an air lift comprising a hose line 56, connected with the compressor 20.

By the present invention there is further provided a skimmer 58 disposed near the upper portion of the first settling chamber 42 for collecting floating waste components or scum from the surface of the fluid therein and for returning them to the receiving chamber 30. A conduit 60 is connected with the skimmer and has its open end adapted to empty into the receiving chamber as illustrated in FIG. 1. Air under pressure is supplied to the conduit through the hose 62. The skimmer 58, conduit 60, and conduit 54 thus constitute feedback means connected with the receiving chamber 30 and with the first settling tank 42 for transferring a portion of the contents of the latter to the receiving chamber for further processing.

A portion of the fluid contained in the first settling chamber 42 is allowed to run through a gravity chlorinator 64 and into the second settling chamber 46. This flow occurs at a predetermined rate, such that the level of fluid in the first settling chamber 42 is maintained at the level shown in FIG. 1. This is necessary to insure proper operation of the skimmer to be discussed below. The chlorinator operates on a well-known flow-through principle, wherein active chlorine contained in chlorine tablets disposed in a feed tube is slowly released by the dissolving action of the water flowing past the tubes. In the second settling chamber 46, any remaining solids settle to the bottom and are picked up and transferred back to the receiving chamber 30 by means of another conduit 66 and air line 67, the conduit and air line thus constituting feedback means connected with the receiving chamber and with the second settling chamber for returning the solids or the higher density portions of the latter to the receiving chamber for further processing.

In accordance with the present invention there is further provided a discharge chamber 68 and means for effecting flow of the contents of the second settling chamber 46 to the discharge chamber 68, the flow-effecting means comprising a conduit 70 and air line 72. It is to be noted that in FIG. 1 the open end of the conduit 70 is disposed away from the bottom portion of the chamber 46 such that any fluid which is drawn thereinto will contain a minimum of solids, since the latter will normally settle to the bottom of the chamber and will be removed and transferred to the receiving chamber through the conduit 66. Further separation of any remaining solids occurs as the fluid passes through a filter screen 69 and into the discharge chamber 68, the latter having an outlet 70 through which the treated wastewater can be distributed to leaching fields or the like.

The present invention further comprises switch and regulating means responsive to the level of fluid in the aeration chamber 34 for reducing the flow of air from the diffusers 38. At times when no sewage is entering the system, the level of fluid in the aeration chamber 34 will tend to drop, since fluid is being removed therefrom a transferred to the first settling chamber 42 at a fixed rate. At such time as the level falls below a certain point, a float switch 74 senses the low level condition and signals a regulator 76 which switches the compressor 20 to intermittent duty. This has the effect of greatly reducing the air flow from the diffusers 38 and thus preventing over-aeration and putrefaction of the contents of the aeration chamber, and simultaneously reducing the flow from the aeration chamber 34 to the first settling chamber 42, and from the second settling chamber 46 to the discharge chamber 68. By the above arrangement the system automatically regulates the rate of purification to suit the requirements imposed by the rate of flow of sewage entering the inlet 32. After a period of intermittent duty, the system can effectively handle a substantial surge load (until the level in the aeration chamber reaches its maximum.) When the level has risen above that of the float switch, the system resumes its continuous duty rate of treatment.

In addition there is further provided a means for generating a warning signal comprising an alarm 78 and switch means 80 responsive to the level of fluid in the aeration chamber 34 for activating the alarm when the fluid level has exceeded a predetermined point. The switch means 80 can be a simple float switch similar to the switch 74 previously discussed. The alarm can provide an audible warning signal, or can be used to activate other signal means or equipment (not illustrated) at a convenient location remote from the storage treatment tank.

In accordance with the present invention there is also provided a novel and improved aerated distribution box 82 for use with the wastewater treatment system described hereinabove. Referring to FIGS. 3 and 4 the distribution box comprises an aeration chamber 84 and a settling chamber 86, the two chambers being separated by a non-perforated baffle 87. The aeration chamber is provided with diffusing means for introducing air under pressure into the contents of the chamber, the diffusing means comprising a diffuser 88, an air hose 90 and a hose fitting or adaptor 92. Air can be supplied to the diffuser 88 from a air hose (not shown) connected between the adaptor 92 and the air valves 22 (FIG. 1) connected with the compressor 20 in the motor housing 18 of the main storage treatment tank 12. The effluent from the outlet 70 of the discharge chamber 68 is received in the inlet 94 of the distribution box. A trap 96 isolates the vapors in the distribution box from the vapors in the storage treatment tank discharge chamber 68. The settling chamber 86 has outlets 98, 100 and 102 which lead to leaching fields, sand filters or the like. A lid 103 provides a closure for the box 82.

By the above arrangement the effluent from the distribution box is highly aerated, which is a desirable characteristic for a fluid to have when it is entering a leaching field where it can be employed for providing digestion of any organic matter which may be present. The high, dissolved oxygen content of the effluent will also aid evaporation and evapotranspiration. The additional cost of the tertiary treatment provided by the aerated distribution box is relatively small. As noted above, air under pressure is already available from the compressor in the storage treatment tank, and since the use of some type of distribution system is required anyway, the additional expense of employing the aerated distribution box of the present invention, is indeed small and very worthwhile.

There are numerous advantages to the system described above. It is noted that the use of mechanical moving parts has been virtually eliminated, except for the compressor. Replacement of the compressor is easily accomplished in a few minutes, since the unit is readily accessible and draining of any portion of the tank is not required. The tank is preferably constructed of non-corroding components such as plastic, to provide light-weight construction and long-lasting, maintenance-free service. Flow of the fluid through the tank is controlled so as to minimize over-aeration, and to enable surge loads to be handled without sacrificing treatment efficiency. The efficiency of the system is high, since the separation of solids occurs at a minimum of five locations in the storage treatment tank. Thus, the effluent from the tank has an absolute minimum of suspended and dissolved solids and is, for the most part, water. As a result, there is minimized the danger of clogging of the leaching fields or the sand filters following the tank. Such is not the case with conventional septic systems, in which solids are often permitted to pass from the tank and into the surrounding fields, tending to clog the latter and reduce the drainage capability of the latter. Finally, the system of the present invention has the distinct advantage of low cost over that of larger treatment facilities, the latter frequently constituting too great an expense to be shared by a small community of several hundred residents, when the cost of pipes is considered, and the design capacity of a central treatment system is being planned to accommodate increased use at some future date. The present invention also embraces a novel method for treating wastewater in a treatment system comprising a storage tank 12 having a receiving chamber 30, an aeration chamber 34, a settling chamber 42, an additional settling chamber 46, a discharge chamber 68, and a distribution box 82. The method of using the apparatus comprises the steps of discharging wastewater having both solids and liquid into the receiving chamber 30, transferring part of the contents of the receiving chamber through a filter screen 36 and into the aeration chamber 34 whereby solids having a size greater than a predetermined amount are retained in the receiving chamber, aerating the contents of the aeration chamber, transferring part of the contents of the latter to the first settling chamber 42 where higher density portions of the wastewater are allowed to settle to the bottom thereof, and transferring these higher density portions from the settling chamber back to the receiving chamber for further processing.

The method further includes the additional steps of collecting the lower density portions floating on the surface of the contents of the first settling chamber 42 by means of a skimmer 58 and transferring them to the receiving chamber 30, for further processing and transferring other portions of the contents of the first settling chamber 42 to the additional settling chamber 46 where the higher density portions of the contents of the latter are allowed to settle and become separated from the lower density portions thereof. Additional steps include the returning of the higher density portions of the contents of the additional settling chamber 46 which have settled to the bottom thereof, to the receiving chamber 30 for further processing, and passing lower density portions of the contents of the additional settling chamber 46 through a filter screen 69 and into a discharge chamber 68, where any remaining suspended solid portions are allowed to settle and become separated from liquid portions, and discharging the liquid portions from the discharge chamber and transferring them into a distribution box 82. The present invention finally embraces the additional steps of aerating the contents of the distribution box and discharging them through distribution box outlets 98, 100, and 102 and into a leaching field, sand filter or other tertiary treatment system.

Another embodiment of the invention is illustrated in FIG. 5, showing a somewhat modified storage treatment tank 104 having an upper casing 106 and a lower casing 108. An air compressor 110 is disposed in a motor housing 112, and supplies air under pressure to a series of air valves 114 which are located outside the motor housing. By such an arrangement, the number of holes in the motor housing 112 is minimized, and heat generated by the compressor will be less likely to affect the operation of the valves. A control box 116 is provided to interrupt power to compressor 110. The tank is provided with a removable lid 118, the motor housing having a similar lid 120 and air vent 122.

By the present invention there is provided in the tank 104 a receiving chamber 124, which contains a particulate mass comprising pieces of solid material 126, the pieces having substantial surface areas for promoting the formation of bacterial slime.

An aeration chamber 128 having a size larger than that illustrated in FIG. 1, closely adjoins the receiving chamber 124 and communicates therewith by means of a perforated divider or filter screen 130, similar to the screen 36 of FIG. 1. Ceramic diffusers 132 provide aeration of the contents of the aeration chamber 128. A float switch 129 and regulator 131, and a switch means 133 and alarm 135, in FIG. 5 operate in a manner analogous to the switch 74 and regulator 76, and switch means 80 and alarm 78 respectively of FIG. 1.

As shown in FIG. 5, the modified treatment tank 104 further includes a first settling chamber 134 and a second settling chamber 136. The walls 137, 138 of the chamber 134 are solid and non-porous and do not enable the passage of liquid therethrough. Aerated fluid or supernatant from the aeration chamber 128 is transferred into the first settling chamber 134 by means of a conduit 140 and air pressure supplied through hose line 142. The level in the chamber 134 is normally that indicated by the dotted line 144. Sludge and high density portions of the contents of the first settling chamber 134 are transferred back to the receiving chamber 124 by means of the conduit 146 and pressure from the hose line 148. Through an additional conduit 150 connected by a T-fitting with a gate valve 152, the supernatant from chamber 134 is drawn from a depth of approximately 16 inches below the surface and transferred by gravity to chamber 136 with the gate valve upended and normally open. This overflow is caused by an excess of fluid transfer through conduit 140 over that of conduit 146, the latter also removing liquid and settled solids from chamber 134. By partially closing valve 152 the water level is raised and adjusted to the height of the wall 137 or to the level of a weir on the wall (not shown). By making the level of the top of the wall 137 the same as the level of the gate valve 152 as shown in FIG. 5, and by increasing the amount of transfer through conduit 140, continuous overflow will result in both directions, skimming the surface of chamber 134 and returning scum back to aeration chamber 128, and at the same time drawing the supernatant through conduit 150 and gate valve 152. The chamber 134, gate valve 152 and conduit 140 thus constitute skimmer type transfer means for returning surface components of fluid from the first settling chamber 134 to the aeration chamber 128 on a continuing basis as long as treatment unit is operating.

The effluent from the gate valve 152 enters the second settling chamber 136, which is filled with a layer of crushed stone, a layer of washed filter sand or small pea stone, and a second layer of crushed stone. The stone and sand constitute filter means for separating suspended solids from fluid flowing downward therethrough. A discharge conduit 154 having a hose line 156 connected therewith transfers filtered fluid from the bottom of the second settling chamber 136 into a discharge elbow 158, which has a very fine mesh teflon screen 160 adjacent one end. The screen filters out remaining particles which may still be suspended in the fluid. The second settling chamber 136 is provided with a skimmer or backwash skimming device 162, whose inlet 164 is above the normal level of fluid in the chamber. A hose line 166 is connected with the skimmer as shown. Also, the conduit 154 has connected therewith a gate valve 168, the purpose of which will be described below.

After prolonged periods of operation, the crushed stone and filter sand contained in the second settling chamber will become clogged with settled solids. It is desirable to be able to force fluid upwards through the stone and sand to dislodge the settled solids and remove them from the chamber. This is readily accomplished by closing gate valve 168. When this is done, air under pressure emerges from the open end 170 of conduit 154 and causes a "backwash" upwards through the stone and sand, and at the same time, the level of fluid in the chamber 136 increases, since fluid is still entering it through gate valve 152. As the level therein rises above the level of the open end 164 of the skimmer 162, the latter picks up surface fluid, including the agitated solids, and returns them to the aeration chamber. When sufficient backwash has been effected, the gate valve 168 is opened, the level of fluid in chamber 136 falls to its normal level, and the filtering of the effluent continues as described above, the sand and crushed stone having been cleaned by the backwash operation.

It will be readily seen that the modified tank of FIG. 5 can be employed with the distribution box illustrated in FIGS. 3 and 4, with the operation of the latter being analogous to that already described in connection with the first mentioned embodiment.

From the above, it can be seen I have provided a novel and improved wastewater treatment system which is simple in construction, sufficiently low in cost and economical so as to be readily applicable to single family dwellings, and which is virtually maintenance-free. In addition, the invention includes a method of using the apparatus for treating wastewater, the method having maximum efficiency and providing effective treatment of wastewater containing both suspended and dissolved solids. The system is thus seen to represent a distinct advance and improvement in the field of wastewater treatment and disposal.

Variations and modifications are possible without departuring from the spirit of the invention.

I claim:

1. A wastewater treatment system comprising, in combination:
  a. a storage treatment tank having a receiving chamber for accommodating waste products to be processed, said receiving chamber having a perforated filter screen constituting one wall portion thereof, b. said treatment tank having an aeration chamber adjoining the receiving chamber and communicating therewith through said filter screen, to receive fluid comprising solids and liquids therefrom, the perforations of said screen enabling solid particles smaller than a predetermined size to pass therethrough to said aeration chamber, but blocking particles having a size larger than said predetermined value, c. diffusing means for introducing air under pressure into said aeration chamber, for aerating the fluid contents thereof, d. said tank further having a first settling chamber for separating solid portions of said fluid from liquid portions thereof, e. means for transferring to said first settling chamber aerated fluid from an area in the aeration chamber which is substantially below the upper surface of said fluid but is above the bottom level of the chamber, whereby neither dense solid portions nor floating scum is passed to said first settling chamber, f. said tank further having a second settling chamber adapted to receive liquid from said first settling chamber, g. feedback means connected with said receiving chamber and with said first settling chamber, for returning the higher density portions of the contents of the latter to the receiving chamber for further processing.

h. said storage treatment tank further having an outlet and means connected therewith for discharging portions of the contents of said second settling chamber, i. aerating and distribution means connected with said storage treatment tank outlet for providing further aeration of the effluent from said outlet, j. said aerating and distribution means comprising a distribution box having an elbow constituting an inlet therefor, k. said distribution box further comprising an aeration chamber, l. diffusing means for introducing air under pressure into said distribution box aeration chamber, for aerating the fluid contents thereof, and m. a settling chamber for receiving fluid from said distribution box aeration chamber and for separating solid portions of said fluid from liquid portions thereof, n. said distribution box further comprising outlet means communicating with said distribution box settling chamber, for discharging portions of the contents thereof.

* * * * *